(12) United States Patent
Leach

(10) Patent No.: US 6,954,814 B1
(45) Date of Patent: Oct. 11, 2005

(54) METHOD AND SYSTEM FOR MONITORING AND TRANSMITTING UTILITY STATUS VIA UNIVERSAL COMMUNICATIONS INTERFACE

(75) Inventor: Mark Leach, Lizella, GA (US)

(73) Assignee: Amron Technologies Inc., Hartsville, SC (US)

( * ) Notice: Subject to any disclaimer, the term of this patent is extended or adjusted under 35 U.S.C. 154(b) by 144 days.

(21) Appl. No.: 09/591,258

(22) Filed: Jun. 9, 2000

Related U.S. Application Data

(60) Provisional application No. 60/138,360, filed on Jun. 10, 1999.

(51) Int. Cl.[7] ................ G06F 13/14; H04M 11/00; G08C 15/06
(52) U.S. Cl. ............ 710/305; 379/106.03; 340/870.02
(58) Field of Search ................ 379/106, 107, 379/93, 106.03; 374/142; 340/870, 584, 340/870.02; 343/878, 879; 370/313; 324/110, 324/142; 600/300; 702/64; 709/206; 710/110

(56) References Cited

U.S. PATENT DOCUMENTS

| | | | | |
|---|---|---|---|---|
| 5,031,209 A | * | 7/1991 | Thornborough et al. | 379/106.03 |
| 5,111,407 A | * | 5/1992 | Galpern | 340/870.02 |
| 5,451,937 A | * | 9/1995 | Olson et al. | 327/100 |
| 5,473,322 A | * | 12/1995 | Carney | 324/110 |
| 5,590,179 A | * | 12/1996 | Shincovich et al. | 340/870.03 |
| 5,852,658 A | * | 12/1998 | Knight et al. | 379/106.03 |
| 5,875,234 A | * | 2/1999 | Clayton et al. | 379/229 |
| 5,898,387 A | * | 4/1999 | Davis et al. | 340/870.02 |
| 5,914,941 A | * | 6/1999 | Janky | 370/313 |
| 5,923,269 A | * | 7/1999 | Shuey et al. | 340/870.02 |
| 5,986,574 A | | 11/1999 | Colton | |
| 5,994,892 A | * | 11/1999 | Turino et al. | 324/142 |
| 6,118,269 A | * | 9/2000 | Davis | 324/110 |
| 6,199,133 B1 | * | 3/2001 | Schnell | 710/110 |
| 6,212,550 B1 | * | 4/2001 | Segur | 709/206 |
| 6,215,405 B1 | * | 4/2001 | Handley et al. | 340/584 |
| 6,219,409 B1 | * | 4/2001 | Smith et al. | 379/106.03 |
| 6,290,646 B1 | * | 9/2001 | Cosentino et al. | 600/300 |
| 6,304,231 B1 | * | 10/2001 | Reed et al. | 343/702 |
| 6,360,177 B1 | * | 3/2002 | Curt et al. | 702/64 |
| 6,509,841 B1 | | 1/2003 | Colton et al. | |

* cited by examiner

*Primary Examiner*—Glenn A. Auve
*Assistant Examiner*—Christopher E. Lee
(74) *Attorney, Agent, or Firm*—Sutherland Asbill & Brennan LLP

(57) ABSTRACT

A method and system for monitoring utility meter status, and transmitting a status message via an output device connected to a universal communications interface in the event that the utility meter status meets a predetermined condition. Typically, the predetermined condition is a power loss, signified by a drop in voltage or current. The system is connected to a utility meter, such as an electric meter. The voltage level of the electric meter is monitored through a voltage input interface. An analog-to-digital converter transforms the voltage waveform into a series of digital data packets, which are then transmitted to a microprocessor. The microprocessor monitors the digital signal for a power loss indication, or other predetermined condition. Once a predetermined condition is met, the microprocessor transmits a status message across a universal serial bus to a universal communications interface. The universal communications interface is connected to at least one slot, which contains at least one output device. The universal communications interface is further able to determine the proper signal format employed by the output device for information transmission. Upon receipt of the status message, the universal communications interface converts the status message to the signal format employed by the output device, and passes the converted status message to the output device via the slot. The output device may then transmit the status message to a remote receiver in order to quickly and accurately update distant locations regarding the utility meter.

10 Claims, 2 Drawing Sheets

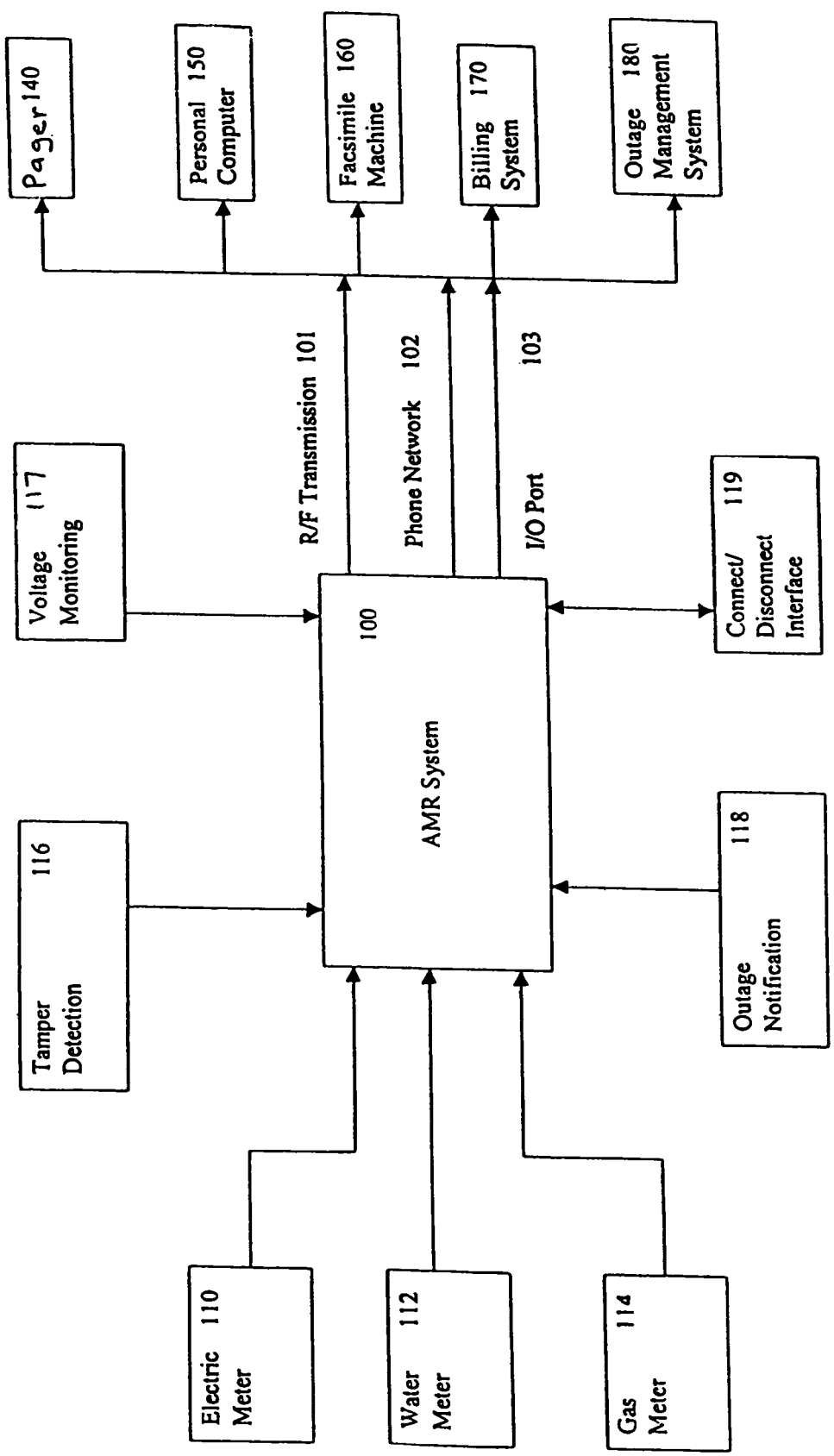

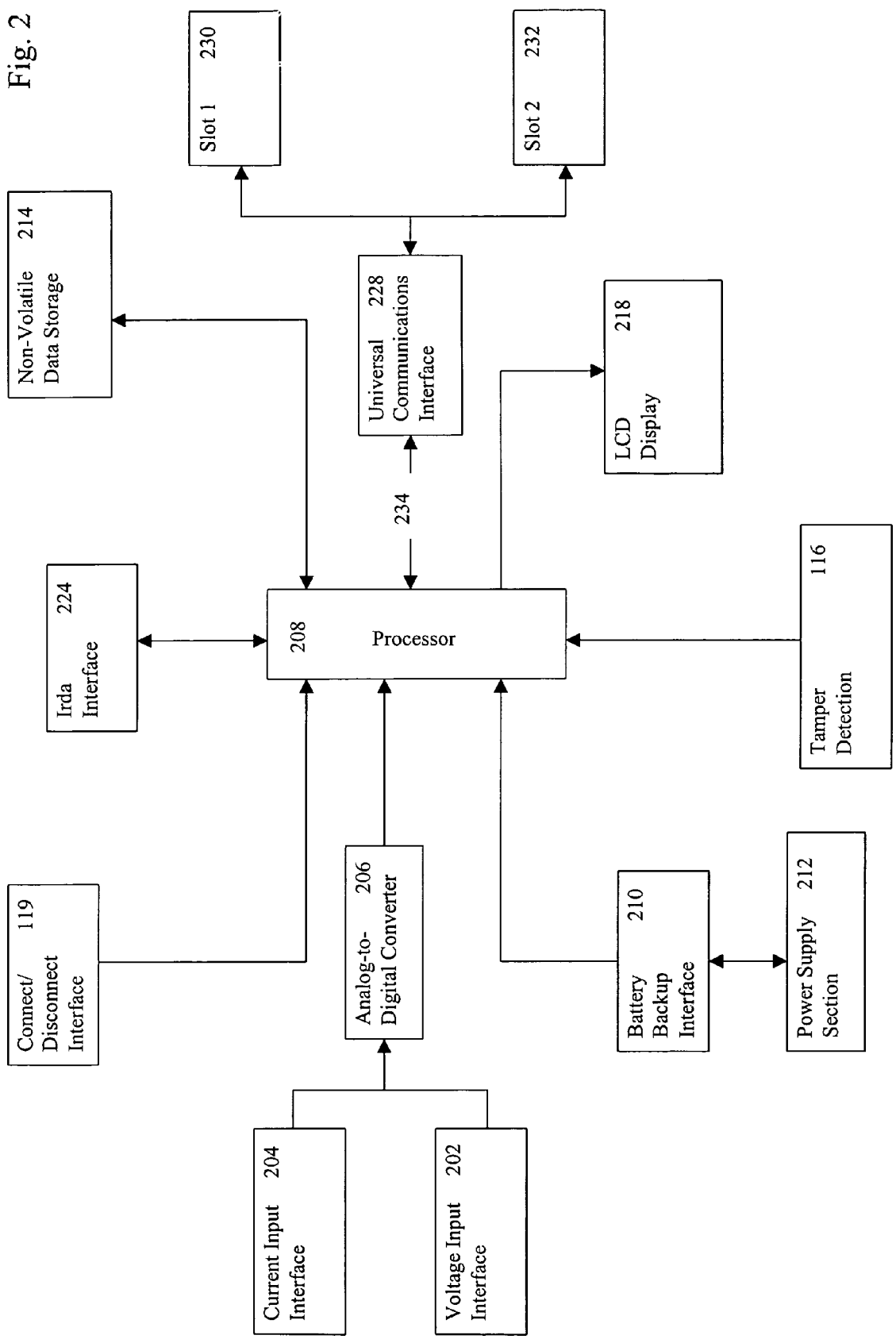

METHOD AND SYSTEM FOR MONITORING AND TRANSMITTING UTILITY STATUS VIA UNIVERSAL COMMUNICATIONS INTERFACE

RELATED APPLICATIONS

The present application claims the benefit of U.S. Provisional Patent Application Ser. No. 60/138,360, filed Jun. 10, 1999.

TECHNICAL FIELD

The present invention relates generally to automated meter reading. More particularly, the present invention relates to an automated meter for collecting data and communicating with a remote site.

BACKGROUND OF THE INVENTION

Automated meter reading (AMR) devices are often configured to transmit data relating to utility usage parameters to a remote location, such as a utility company. An AMR device may be a retro-fit device or a solid-state device. A retro-fit AMR device attaches to an existing utility meter and includes functionality to read the existing utility meter, transform the meter reading into usable data and transmit the data to a remote location. Solid-state AMR devices are designed to replace the existing utility meter and are attached directly to the utility line to measure utility usage data.

A significant drawback of prior art AMR devices is that they are functionally limited in their communications options and are thus not generally adaptable to evolving communications technology. AMR devices are typically constructed with hardware and/or software components for transmitting and receiving AMR data over a single communications medium. Some prior AMR devices may be equipped with components for transmitting and receiving AMR data over a finite number of communications media. However, as communications technology advances and new and different communications mediums are selected for the transmission of AMR data, incompatible AMR devices must be replaced at great expense to the utility companies. Unfortunately, the cost of replacing incompatible AMR devices is often passed on to the consumer.

Therefore, there remains a need in the art for an AMR device that is able to adapt to evolving communications technology by being operable to transmit and receive AMR data via any communications medium.

SUMMARY OF THE INVENTION

Generally stated, the present invention is directed to a method and system for providing notification of utility status to a remote location. Typically, this notification takes the form of a meter reading message, including such information as power outage, low voltage, or the current meter reading. The present invention provides a device for transmitting status information to a utility or other end user regarding the current status of a utility meter. An exemplary embodiment of the present invention may be recognized as a system including at least one input, a microprocessor, a universal bus, a universal serial port, and at least one communications slot.

The system is attached (either physically or via a remote connection) to the utility meter, from which an input signal is received. The system is additionally connected to an output device, such as a radio frequency transmitter, a modem, a coaxial cable, and so on. These output devices communicate with a system microprocessor through the use of a universal communications interface and a universal bus. The universal communications interface is connected to one or more slots, which are operative to accept various forms of output devices. The universal communications interface is equipped with "plug and play" technology, so that the interface may recognize a connected output device and relay signals between the microprocessor and output device in the proper data format.

Generally, the system transmits a status message containing the current meter reading and/or any trouble condition via the connected output device to a receiver, so that the status of the monitored utility may be instantly known at a remote location. Specifically, the microprocessor monitors the input signal for a trouble condition. A "trouble condition" is typically defined as a specific value which the input signal must not exceed or fall below. In the event that the trouble condition is reached, the microprocessor transmits a status message of a type in accordance with its programming. The microprocessor sends the status message across the universal bus to the universal communications interface, which in turn modifies the data format of the status message such that an output device connected to the slot may accept and relay the message.

That the invention improves over the drawbacks of prior document classification systems and accomplishes the advantages described above will become apparent from the following detailed description of the embodiments and the appended drawings and claims.

BRIEF DESCRIPTION OF THE DRAWINGS

FIG. 1 is a signal flow block diagram displaying field use of an exemplary automated meter reading system in accordance with an exemplary embodiment of the present invention.

FIG. 2 is a functional block diagram of an exemplary automated meter reading system in accordance with an exemplary embodiment of the present invention.

DETAILED DESCRIPTION OF THE EXEMPLARY EMBODIMENT

The exemplary embodiment relates to a system for automated meter reading (AMR). The AMR system 100 of the present invention is equipped with a universal communications bus coupled to a universal communications port, which allows the device to operate with interchangeable communications devices. The AMR system 100 is also equipped with "plug and play" technology, so that the AMR system 100 is able to recognize and communicate with a variety of communications devices that may be plugged into its universal communications port. Accordingly, with proper configuration, an appropriate communications device may be plugged into the AMR system 100 to enable the transmission and reception of AMR data over any given type of communications medium. Of course, the communications medium selected by the utility company for AMR transmission and reception dictates the type of communications device that must be plugged into the AMR system 100.

The following description of exemplary embodiments of the present invention will refer to the drawing, in which like numerals indicate like parts throughout the several figures. The exemplary embodiments will be discussed with particular reference to an AMR system 100 adapted for power. However, it should be kept in mind that the present invention may also be adapted for other types of utilities, such as water and gas.

FIG. 1 displays a signal diagram of an exemplary AMR system 100 in accordance with the present invention. As shown, the exemplary AMR system may accept data inputs from multiple sources, and send data through multiple output connections in a variety of data formats. FIG. 1 is intended only to show a possible use of the exemplary embodiment, and accordingly the figure and following text should be regarded as an illustration rather than limitation of use.

The AMR system 100 may be connected to a variety of meters, such as an electric meter 110, water meter 112, gas meter 114, and so on. One AMR system may be used to monitor multiple meters, or each meter may have a dedicated system connected. Further, the AMR system 100 may accept additional signals from utilities such as a tamper detection monitor 116, a voltage monitor 117, an outage notification monitor 118, or a reconnect/disconnect monitor 119. Alternately, the AMR system may have built-in functionality to monitor these events.

The AMR system 100 receives input data from the monitored meters in a variety of formats. Typically, the data takes the form of a voltage or current level present in a given meter, although alternate embodiments may accept radio frequency (R/F) data, pressure level, temperature, and so on. When this input signal reaches a certain threshold for a specific period of time, the AMR system 100 transmits a notification signal via a connected output device to a receiving device.

Sample output transmissions include a R/F transmission 101, a DTMF signal sent across a telephone network 102, or a data signal transmitted through a computer I/O port 103, such as a serial, parallel, or USB port. The AMR system may be programmed to transmit on one or more connected devices in one or more signal formats. Exemplary receiving devices include a pager 140, a personal computer 150, a facsimile machine 160, a utility billing system 170, or an outage management system 180. For example, a single AMR system 100 may transmit a first signal across the telephone network 102 to a pager 140, notifying a technician of a power outage at the monitored electric meter 110. Simultaneously, the system may send a R/F transmission 101 to a billing system 170, notifying the billing system to temporarily suspend billing a customer's account until such time as the electric meter is repaired.

FIG. 2 shows a block diagram of an exemplary AMR system 100 in accordance with the present invention. As shown, the exemplary AMR system 100 includes a voltage input interface 202 and a current input interface 204. Voltage and current are received from a power line (not shown). As should be apparent to those of skill in the art, the input interfaces may be adapted for input from a single phase or three-phase power source. The voltage input interface 202 and current input interface 204 are coupled to an analog-to-digital conversion device 206, such as an RMS converter. Digital signals representing the converted voltage and current are then fed to the processor 208, where the utility usage readings are measured and processed in a conventional manner.

The processor 208 is controlled by firmware stored in the non-volatile data storage 214. Non-volatile storage 214 may include RAM and/or ROM and may be scalable in capacity. RAM may be programmable and re-programmable, so that operational parameters of the AMR system 100 may be changed. The non-volatile storage 214 may be re-programmed remotely through a communications device. Alternatively, non-volatile storage 214 may be re-programmed locally through an IRDA interface 224, or the like. As shown, the AMR system 100 may include additional components, such as: a reconnect/disconnect interface 119 for enabling re-connect and disconnect of utility services; a tamper detection device 116 operable to detect physical tampering with the AMR system 100; a power supply 212 and a battery back-up interface 210. Other components not shown may include an outage notification interface, a voltage monitoring interface and a temperature monitoring interface. Still other components will occur to those of ordinary skill in the art.

The AMR system 100 is equipped with a universal communications interface 228, which allows the system to communicate via any medium, such as: R/F, telephone, cable, fiber optics, satellite, power line carriers, etc. The universal communications interface 228 sends and receives data to and from a communications device (not shown), via ports or slots 230 and 232. Slot 1 230 and slot 2 232 each provide inputs and outputs for coupling with communications devices (not shown). Communications devices may be coupled to the slots 230 and 232 in any well known manner, such as through use of a circuit board or "card", a multi-prong connector (either male or female), a coaxial jack, or other manners apparent to those skilled in the art. Additional slots may be included for coupling additional communications devices to the universal communication interface 228. The universal communications interface 228 also sends and receives data to and from the processor 208 via a universal bus 234.

In a preferred embodiment, the universal bus 234 comprises a 4-bit parallel bus. By using a 4-bit parallel bus, the AMR system 100 may transfer up to four bits of information simultaneously from the universal communications interface 228 to the processor 208, and vice-versa. This permits data from a single source to be rapidly transmitted to and from the processor. Further, the bus 234 may multiplex data transmissions originating from or sent to multiple sources. That is, rather than transmitting a single data bit from a single source interfaced with slot 1 230, then transmitting the next data bit from a second source interfaced with slot 2 232, the bus may simultaneously transmit data to or from up to four devices connected to the universal communications interface 228. For example, a R/F transmitter sending data to a remote location may be connected to slot 1 230, a transmitter operative to notify a pager upon voltage loss may be connected to slot 2 232, another transmitter operative to call a cell phone and play a prerecorded message upon tamper detection may be connected to a third slot, and so on. The universal bus 234 permits the processor 208 to send multiple bits simultaneously to a single device, thus speeding data transmission rates, or to communicate with several devices simultaneously, thus allowing signal multiplexing.

In alternate embodiments, the universal bus 234 may be an 8-bit bus, 16-bit bus, or bus of any other size without departing from the spirit and scope of the present invention.

Due to the fact that data generated internal to the AMR system 100 (i.e., the processor 208) will be digital and data generated external to the AMR system 100 may be analog, the universal communications interface 228 may comprise analog-to-digital and digital-to-analog converters. The universal communications interface 228 may also comprise such components as a clock, a shift registers, multiplexers, and the like for facilitating the transfer of data between the processor and various types of communications devices. The universal communications interface 228 may include its own processor and non-volatile storage or may be controlled by the processor 208 and utilize the non-volatile storage 214 of the AMR device. Plug-and-play software or firmware may be stored in a non-volatile storage for enabling the universal communications interface 228 to recognize a communications device that is plugged into a slot 230 and 232. As mentioned, a non-volatile storage may be easily re-programmed for updating or adding plug-and-play software or firmware as needed.

Accordingly, the AMR system 100 of the present invention has the ability to send and receive data in ASCII code, DTMF signals, or any other type of signal or data transfer protocol. As an example of the advantages of the universal communications capabilities of the present invention, the AMR system 100 may transfer digital data directly to a digital computer, a fax machine, alphanumeric display cell phone, or a pager of a utility company without the need for a DTMF-to-ASCII converter at the utility company.

An exemplary embodiment of the present invention may be configured to individually or simultaneously read power, water and/or gas meters. When configured to read several meters simultaneously, an exemplary AMR system 100 is positioned at a central meter and additional remote circuitry is placed at one or more remote meters. The remote circuitry is programmed to collect data from a remote meter and to send the data to the AMR system 100 via a communications device, such as an R/F modem. Data is then processed and transmitted from the AMR system 100 to a utility company via the universal communications interface 228.

Alternate embodiments of the present invention will become apparent to those having ordinary skill in the art to which the present invention pertains. Such alternate embodiments are considered to be encompassed within the spirit and scope of the present invention.

CONCLUSION

The AMR system 100 may include additional functionality not herein specifically described. For example, the system may accept to transmit signals in data formats other than those explicitly specified. The AMR system 100 may also have more or less communications slots than enumerated, or may have a universal bus 234 of a size other than four bits. Many other modifications and additional features will become evident in view of the preceding description of the embodiments of the invention. It should be understood, therefore, that the foregoing relates only to certain embodiments of the invention, and that numerous changes may be made therein without departing from the spirit and scope of the invention as defined by the following claims.

What is claimed is:

1. A system for monitoring and transmitting utility status via a universal communications interface, comprising:
    an input interface operative to receive a utility status signal from a utility meter;
    a processor functionally coupled to the input interface for receiving the utility status signal from the input interface and operative to generate a status message based on the utility status signal;
    a universal communications interface, local to the utility meter, functionally coupled to the processor and configurable for communicating with a plurality of different types of communication devices, each different type of communication device operative to communicate with a receiving device via one of a plurality of different communication mediums;
    a slot functionally coupled to the universal communications interface and configured to interchangeably connect one of the plurality of different types of communication devices;
    wherein the processor communicates with the universal communications interface to determine which one of the plurality of different types of communication devices is connected to the slot; and
    wherein the processor formats the status message into a format compatible with the connected communication device and transmits the formatted status message to the universal communications interface for transmission to the connected communications device.

2. The system of claim 1, wherein the plurality of different communication mediums are selected from the group consisting of radio frequency waves, telephone lines, cable lines, fiber optic lines, satellite links, and power lines.

3. The system of claim 1, wherein the utility status signal comprises an analog wave form; and
    wherein the input interface comprises an analog-to-digital converter operative to convert the analog wave form into a digital signal representing a utility status.

4. The system of claim 1, wherein the utility status signal is received from a connect/disconnect monitor of the utility meter.

5. The system of claim 1, wherein the utility status signal is received from a tamper detection monitor of the utility meter.

6. The system of claim 1, wherein the utility status signal is received from a voltage monitor of the utility meter.

7. The system of claim 1, wherein the utility status signal is received from a current monitor of the utility meter.

8. The system of claim 1, wherein the utility status signal is received from an outage notification monitor of the utility meter.

9. The system of claim 1, further comprising a memory storage functionally coupled to the processor for storing computer-executable instructions executed by the processor; and
    wherein said computer-executable instructions cause the processor to determine whether the utility status signal exceeds a threshold value and, if so, to generate the status message.

10. The system of claim 9, wherein the memory storage further stores data relating to signal formats compatible with each of the plurality of different types of communication devices.

* * * * *